United States Patent [19]

Barnaba

[11] 4,048,091
[45] Sept. 13, 1977

[54] PROCESS FOR THE PREPARATION OF REDUCING GASES

[75] Inventor: Pierluigi Barnaba, Rome, Italy

[73] Assignee: Centro Sperimentale Metallurgico S.p.A., Rome, Italy

[21] Appl. No.: 621,229

[22] Filed: Oct. 9, 1975

[30] Foreign Application Priority Data

Oct. 11, 1974 Italy .................................. 53486/74

[51] Int. Cl.$^2$ ........................... C07C 2/14; C07C 2/16
[52] U.S. Cl. ....................................... 252/373; 75/34; 75/35
[58] Field of Search ....................... 252/373; 75/34, 35

[56] References Cited

U.S. PATENT DOCUMENTS

| 2,523,284 | 9/1950 | Eastman | 252/373 |
|---|---|---|---|
| 2,546,606 | 3/1951 | Mayland | 252/373 |
| 2,577,730 | 12/1951 | Benedict et al. | 75/35 |
| 2,976,134 | 3/1961 | Paull | 48/214 A |
| 3,010,813 | 11/1961 | Clarke | 252/373 X |
| 3,784,364 | 1/1974 | Slater et al. | 252/373 |

FOREIGN PATENT DOCUMENTS

| 890,189 | 2/1962 | United Kingdom | 252/373 |

Primary Examiner—Howard T. Mars
Attorney, Agent, or Firm—Young & Thompson

[57] ABSTRACT

A reducing gas high in $H_2$ plus CO and low in $H_2O$ plus $CO_2$, and therefore suitable for steelmaking, is produced from hydrocarbons, e.g. methane, in a two-stage process. In the first stage, the hydrocarbon is partially combusted with oxygen, the oxygen:hydrocarbon molar ratio being in the range 0.60 to 0.75. In the second stage, sufficient hydrocarbon is added to the off gas from the first stage, to raise the ratio of hydrocarbon (unoxidized hydrocarbon from the first stage plus added hydrocarbon in the second stage) to the sum of $H_2O$ plus $CO_2$, to the range 0.8–1.0, while bringing the oxygen to total hydrocarbon ratio (that introduced into the first stage plus that added in the second stage) to about 0.5. The second stage is an adiabatic catalytic conversion, preferably through two successive beds, the first of porous magnesia or alumina, and the second of nickel oxide catalyst supported on porous alumina or magnesia. The off gases from the second stage contain no more than 3.5% by volume $H_2O$ plus $CO_2$ and no more than 1% by volume residual hydrocarbon, balance essentially $H_2$ plus CO.

1 Claim, No Drawings

PROCESS FOR THE PREPARATION OF REDUCING GASES

The present invention relates to a process for the preparation of reducing gases, more particularly for the preparation of reducing gases high in $H_2$ and CO, low in $CO_2$ and $H_2O$ and particularly useful in steelmaking.

The production of reducing gases high in hydrogen content, from hydrocarbons, was developed principally to meet the requirements of the chemical industry. In response to the requirements of that industry, a large number of processes have been developed which, starting from hydrocarbons, permit the production of mixtures of $H_2$, CO, $N_2$, $H_2O$ and $CO_2$ in various proportions.

Thus, in British patent specification No. 1,191,358, there is disclosed a process which utilizes the thermal cracking of hydrocarbons with a subsequent steam reforming of the gas obtained. In U.S. Pat. No. 3,278,452 there is disclosed a two-stage process in which the first stage is a partial oxidation of the hydrocarbon and the second stage is a steam reforming of the gases obtained by this partial oxidation. In French Pat. No. 1,449,208, there is disclosed a catalytic process for the reforming of hydrocarbons in the presence of water vapor. Dutch Patent Appln. No. 65.11884 discloses a process in which hydrocarbon combustion with oxygen and/or air is followed by a reaction of the combustion products with water vapor on a catalyst.

These and other such methods fall generally into one of the following three categories:

1. Continuous catalytic exothermal reforming, i.e. the conversion of natural gases or light naphthas with oxidizing mixtures on nickel oxide catalysts. Ordinarily, the oxidizing agent is water vapor.

2. Non-catalytic autothermal reforming, i.e. partial oxidization of hydrocarbons with oxygen, using special burners, sometimes followed by steam reforming; and 3. Cyclic endothermal reforming, i.e. the combustion of hydrocarbons with oxygen in stoichiometric ratio. Two reactors are used which are alternately used as conversion reactors and combustion chambers.

As mentioned above, these processes were for the most part developed in response to requirements of the chemical industry. Subsequently, however, other branches of industry, and in particular the steelmaking industry, relied increasingly on hydrogen as a reducing agent and hence became interested in the production of hydrogen from hydrocarbons.

However, the known processes for producing hydrogen from hydrocarbons have certain disadvantages when used in the steel industry. For example, the known processes yield relatively high proportions of $CO_2$ and $H_2O$ in the reaction products, which is undesirable if the reaction products are injected into blast furnaces. On the other hand, for the direct reduction of steel, even a high CO content may prove undesirable, despite the fact that CO is of course a reducing gas, because CO may react with hydrogen at the temperatures employed, thereby producing methane and lowering the yield and also forming carbon black from the reduction of the carbon of the methane.

Various proposals for adapting the known methods to steelmaking have not offered worthwhile solutions to the problem, either because they involve removal of $CO_2$ and $H_2O$ by cooling below 100° C with subsequent reheating to the utilization temperature of 800° to 1000° C, or else because they require complicated plant and equipment which is expensive to construct and difficult to operate and control, or else because they result in low production.

It can be theoretically shown that a gas rich in $H_2$ and CO and low in $CO_2$ and $H_2O$, can be produced by the partial combustion of hydrocarbons, with low formation of carbon black, if the mixture undergoing partial combustion has a molar ratio of oxygen to hydrocarbon equal to about 0.5. However, the oxidation and conversion process of hydrocarbons requires a temperature of around 1300° to 1400° C; and with an oxygen to hydrocarbon molar ratio as low as 0.5, this temperature is not attained. In the absence of a sufficiently high temperature, the hydrocarbon is not sufficiently converted and substantial deposits of carbon black form.

To reach the higher temperature of 1300° to 1400° C, therefore, it is necessary to increase the molar ratio of oxygen to hydrocarbon to at least 0.65. But when this is done, then the $CO_2$ and $H_2O$ concentrations rise to within the range 8 to 18%, which is too high a concentration for use in steelmaking.

So the partial combustion of hydrocarbons does not, on its face, seem to offer a ready solution to the problem.

Accordingly, it is an object of the present invention to provide a process for the production of reducing gases that are particularly well suited for steelmaking.

Another object of the present invention is the provision of a process for producing reducing gases with high contents of $H_2$ and CO, and correspondingly low contents of $H_2O$ and $CO_2$, starting from hydrocarbons.

Still another object of the present invention is the provision of a process for the production of reducing gases, which will be relatively simple and inexpensive to practice, which requires only a low capital investment in equipment, and which is dependable and easily controlled as to its results.

Briefly, the present invention comprises the discovery that reducing gases high in $H_2$ and CO and low in $H_2O$ and $CO_2$ can be produced in a two-stage process, the first stage being partial hydrocarbon combustion and the second stage comprising the addition of further hydrocarbon to the products of the first stage and the catalytic adiabatic conversion of this new mixture to the desired product. In the first stage, the hydrocarbon is substantially completely converted with oxygen, the molar ratio of oxygen to hydrocarbon being preferably in the range 0.60 to 0.75. The resulting gas, containing $CO_2$ plus $H_2O$ greater than 10% by volume, is conveyed to the second stage where further hydrocarbon is added such that the overall molar ratio, that is, initial first stage hydrocarbon plus added second stage hydrocarbon, of oxygen to hydrocarbon is equal to about 0.5 and is preferably lower than 0.54. The second stage conversion of the $CO_2$ and $H_2O$ present in the gases from the first stage is effected adiabatically on a catalytic bed, using the enthalpy of the gases as the source of heat.

It will be appreciated that this process is in sharp contrast to the known technique of converting unreacted hydrocarbon with additional water vapor. When according to the known technique, water vapor was added to residual hydrocarbon, a gas was produced which was unsuitably high in $CO_2$ and $H_2O$. But by the present invention, in which what is added is hydrocarbons, the final $CO_2$ plus $H_2O$ will be lower than 2% by volume and the amount of unreacted hydrocarbon is negligible.

The hydrocarbon added in the second stage, has a gas phase volume per cent of 50 to 100% of the sum of $CO_2$ plus $H_2O$ in the gases from the first stage. The molar ratio of total hydrocarbons (unreacted plus added) to $H_2O$ plus $CO_2$ at the beginning of the second stage, is within the range 0.8 to 1.0. This second stage is conducted adiabatically in a catalytic bed at a temperature range of 900° to 1500° C and a pressure preferably within the range of 1 to 10 atmospheres. However, if necessary, higher pressure can be used; and test with pressures as high as 60 atmospheres have been successfully carried out.

The preferred catalyst is nickel oxide supported on alumina or magnesia. Preferably, the second stage of adiabatic catalytic conversion is carried out in two zones, the first of which is a relatively high temperature zone and the second of which is a relatively low temperature zone. The high temperature zone, into which the gases from the first stage and the added or secondary hydrocarbons are introduced, consists of at least one catalytic bed which is preferably alumina or magnesia with a high surface to volume ratio. A first partial conversion occurs in this zone, and the temperature drops to about 1200° to 1300° C. The succeeding or relatively low temperature zone of the second stage consists of at least one catalyst bed containing a nickel-based catalyst on an alumina or magnesia support, in which conversion is completed and the temperature further drops to about 900° C.

The gas from the second stage will contain a maximum of 3.5% by volume $CO_2$ plus $H_2O$ and no more than 1% of unreacted hydrocarbon, the balance being essentially $H_2$ plus CO, at any desired pressure, and at a temperature of the order of magnitude of 1000° C. Such gas is highly desirable, as to its chemical composition and physical properties, for direct use in the steelmaking industry.

The invention will now be described in greater detail; but before doing so, some of the terms employed will be defined. By "oxygen", is meant gases containing to 20 to 100% by volume oxygen, e.g. air, oxygen-enriched air, commercially pure oxygen, etc. In the case of oxygen mixed with another gas, the other gas should be substantially inert to the reactions in question, e.g. nitrogen. The term "hydrocarbon" includes all liquid and gaseous hydrocarbons; but lower alkyl hydrocarbons are preferred. Particularly preferred is methane; and by "methane" is meant not only commerically pure methane, but also natural gas and other such gaseous mixtures in which methane is the principal component by volume, in admixture with the usual minor proportions of other lower hydrocarbons such as ethane, etc. and the usual non-hydrocarbon constituents found in natural gas. Finally, when the term "balance essentially" is used hereafter in connection with gas composition, it is to be understood that substantial quantities of nitrogen present when air is used as the oxygen source and/or natural gas is used as the hydrocarbon source, are not excluded by this term.

In greater detail, therefore, the present invention comprises, as a first stage, the formation of a gaseous mixture in a molar ratio of oxygen to hydrocarbon of 0.6 to 0.75, and its introduction into the first stage for partial conversion. The resulting gas has a composition in the volume range $H_2$ 55-60%, CO 25-35%, $CO_2$ 2-4%, and $H_2O$ 8-15%. This product gas of the first stage is conveyed to the second stage, where it is introduced into the first adiabatic bed filled with a high temperature resistant material, for example porous alumina. To this first bed a second amount of secondary hydrocarbon is introduced, so that the molar ratio of hydrocarbon to $H_2O$ plus $CO_2$ is in the range of 0.8–1.0 and the overall ratio of oxygen used for the partial combustion, to total initial primary plus added secondary hydrocarbon, is no higher than 0.5. The gas leaving this first bed of the secondary stage will contain 5 to 10% by volume $H_2O$ plus $CO_2$ and will enter the second adiabatic bed filled with a porous material as before, but this time impregnated with a nickel-based catalyst. Conversion is completed in this second bed and the gas leaving the second bed of the second stage contains 1 to 3% by volume $H_2O$ plus $CO_2$, with no more than 1% by volume residual hydrocarbon.

To enable those skilled in this art to practice the invention, the following example is given:

Into a partial oxidation burner is introduced 100 $Nm^3/h$ of commercially pure methane at 600° C and 70 $Nm^3/h$ of commercially pure oxygen at 25° C. The gases are both under a pressure of 3 atmospheres. The off gas from this burner is 300 $Nm^3/h$ of gas at 1500° C having the composition by volume $H_2O + CO_2$ 13.3%, $H_2 + CO$ 86.6%, and $CH_4$ 0.1%.

This off gas from the first stage is conveyed to a first adiabatic bed of porous granular $Al_2O_3$. 32 $NM^3/h$ of commercially pure methane at 600° C is also fed to this first adiabatic bed; and the off gases from the first adiabatic bed are conveyed to a second adiabatic bed filled with a supported catalyst whose composition by weight is porous granular $Al_2O_3$ 93.44%, NiO 6.0%, $Fe_2O_3$ 0.15%, $SiO_2$ 0.31%, and CaO 0.2%.

At the outlet of this second bed is obtained 380 $Nm^3/h$ of a reducing gas having the volume composition $H_2$ plus CO 96.9%, $H_2O$ plus $CO_2$ 2.6%, and $CH_4$ 0.5%, at a temperature of 980° C. Pressure throughout the process was maintained at 3 atmospheres.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A process for the production of reducing gases having a high content of CO and $H_2$, comprising, in a first stage, partially combusting methane with a gas containing 20 to 100% by volume oxygen, the molar ratio of oxygen in the oxygen-containing gas to methane being between 0.60 and 0.75, and, in a second stage converting the gas from said first stage on a catalytic bed of porous alumina or magnesia and then on a catalytic bed of nickel oxide supported on porous alumina or magnesia, at a temperature between 900° and 1500° C, by adding further methane such that the oxygen in the oxygen-containing gas of said first stage has a molar ratio to the initial first stage methane and added second stage methane which is about 0.5, while the uncombusted methane from the first stage plus the added methane in the second stage has a molar ratio to the $H_2O$ plus $CO_2$ in the gases from the first stage which is between 0.8 and 1.

* * * * *